May 4, 1965   E. KEZNICKL   3,181,447
CAMERA HAVING A VARIFOCAL OBJECTIVE
Filed March 15, 1961   2 Sheets-Sheet 1
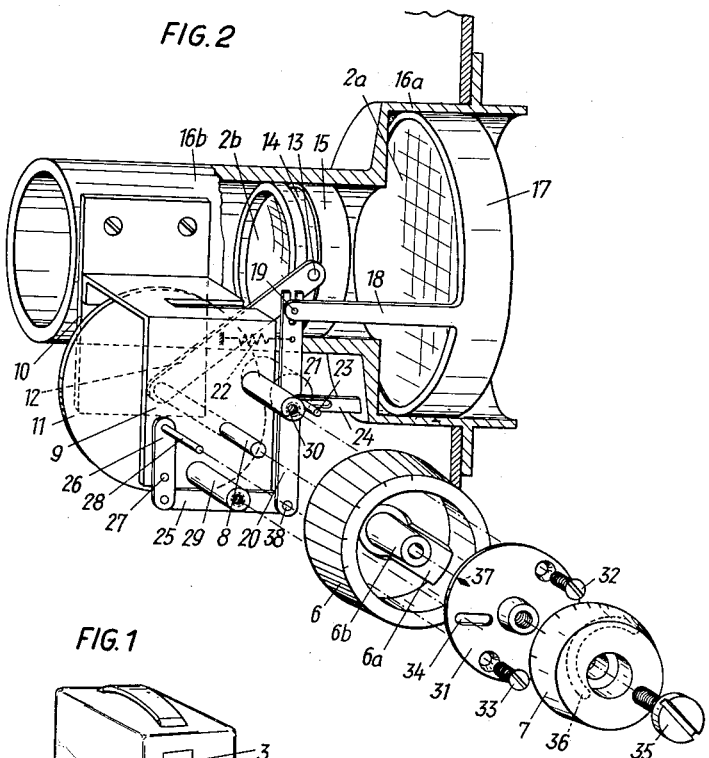
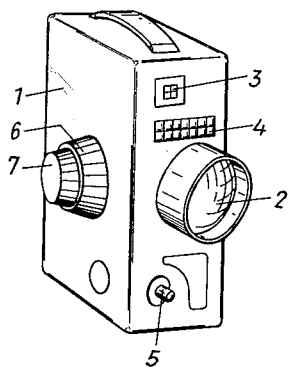
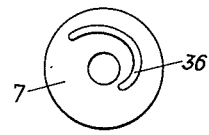
Inventor:
Eduard Keznickl
By Ernest P. Montague
Attorney May 4, 1965  E. KEZNICKL  3,181,447
CAMERA HAVING A VARIFOCAL OBJECTIVE
Filed March 15, 1961  2 Sheets-Sheet 2

Inventor:
Eduard Keznickl
By Ernest P. Montague
Attorney

United States Patent Office 3,181,447
Patented May 4, 1965

3,181,447
CAMERA HAVING A VARIFOCAL OBJECTIVE
Eduard Keznickl, Vienna, Austria, assignor to
Karl Vockenhuber, Vienna, Austria
Filed Mar. 15, 1961, Ser. No. 95,980
Claims priority, application Austria, Apr. 1, 1960,
A 2,504/60
9 Claims. (Cl. 95—45)

The present invention relates to a camera, particularly a substandard film camera comprising a varifocal objective, which is at least partly immerged in the camera casing. Quite generally, the object of the invention is a new and improved arrangement of that kind.

It is the main object of the present invention to provide a camera having a varifocal objective, which permits creation of arrangements for adjusting the focal length of the objective and for focussing, which arrangements assure, even under unfavorable shooting conditions e.g. with travelling or "follow-on" travelling shots effected by changing the focal length, a simple and safe operation of the camera, and making possible a secure and steady support of the camera while handling both adjusting devices when shooting without using a tripod, so that the picture steadiness is not impaired.

It is a further object of the present invention to provide a camera having a varifocal objective, which produces an arrangement which guarantees a simple and accurate control of the movable objective lenses.

It is yet another object of the present invention to provide a camera having a varifocal objective, which permits an arrangement which, in connection with varifocal objectives makes possible, respectively, an indication of the image's depth of field range as a function of the chosen focal length and shooting distance, and of the adjusted diaphragm.

It is also a further object of the present invention to provide a camera having a varifocal objective, which permits an arrangement which indicates on a distance scale by means of two marks, or the like, the limits of the depth of field range as a function of the focal length and of the objective diaphragm aperture.

It is yet a further object of the present invention to provide a camera having a varifocal objective, which permits an arrangement for adjusting the focal length of the objective and for adjusting the object-distance, which arrangement assures a simple focussing of the objective, when shooting objects which are moving toward or away from the camera and continuously changing the focal length in order to maintain an image of constant size.

With these and other objects in view, which will become apparent in the following detailed description, the present invention will be clearly understood in connection with the accompanying drawings, in which:

FIGURE 1 is a perspective view of the camera designed in accordance with the present invention;

FIG. 2 is an exploded diagrammatic perspective view of the novel features of the present invention partially in section;

FIG. 3 is a front elevation of a detail of the arrangement shown in FIG. 2;

Figure 4:
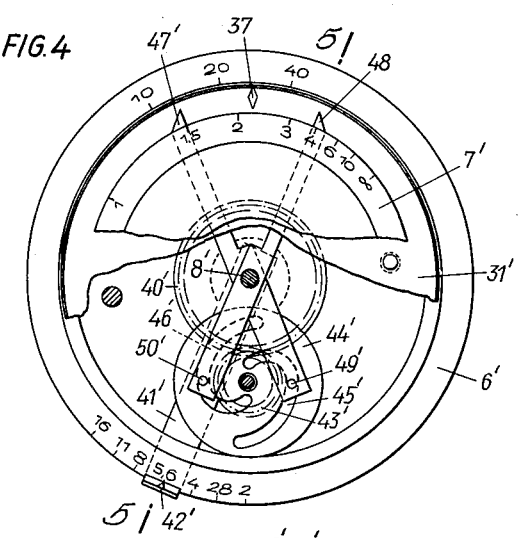
FIGS. 4 and 5 are a front elevation and an axial section, respectively, of another detail of another embodiment of the present invention.

Referring now to the drawings, and in particular to FIG. 1, a substandard film camera 1 is illustrated, in which an objective 2 with variable focal length is built in. The view finder objective 3 is disposed above the objective 2, while a photoelectric cell of a built-in exposure meter 4, and a camera releaser 5 are disposed in the front wall of the film camera 1. On a surface of the camera casing, and that in the range of the user's right hand, an adjusting knob 6 for the objective focal length is notatably arranged. A knob 7 for focussing the objective is provided coaxially thereto. The arrangement is chosen in a way that when both knobs 6 and 7 are jointly rotated, the focal length and the adjustment of distance are altered in the same sense. In an advantageous manner a decrease of the focal length adjustment is coordinated to a clockwise rotation.

Referring now again to the drawings, and in particular to FIG. 2, the adjusting mechanism of the objective 2 is shown diagrammatically. In the main, the objective 2 comprises three members, the rear member of which is adjacent to the film and is permanently mounted. This rear member is not shown in the drawing. The other two members 2a and 2b are moved along the optical axis corresponding to the adjustment of the focal length, the intermediate member 2b performing a movement linear to the alteration of the focal length, while the front member 2a first of all moves, on adjustment of the focal length, in the direction towards the photographic object starting from the smallest value, and after having passed a maximum value slowly returns to its starting position.

The movement of the two objective members 2a and 2b is derived from the adjusting knob 6. The latter is connected with a shaft 8, which is pivoted in the plates 9 and 10 and carries a cam disc 11 as well as a crank 12. The latter has on its free end a pin 13 which glides in an annular groove 14 of the mount 15 of the objective member 2b. The objective member 2b and its mount 15 are movably guided in the part 16b of the objective tube. When the knob 6 is rotated the objective member 2b is moved, in the main, corresponding to the cosine of the angle of rotation of the knob 6.

In the part 16a of the objetcive tube the objective member 2a and its mount 17 are movably guided. The mount 17 has an extension 18 wihch engages with a pin 19 in the forked end of a lever 20. A roller 21, which by means of the force of a spring 22, engages the cam disc 11, is mounted rotatably on the lever 20. The pivot pin 23 of the roller 21 is extended and glides in a stationary pin guide 24.

The other arm of the lever 20 is hingedly connected over a connecting rod 25 with a lever 26, which is rotatably mounted by means of a pivot 27 on the plate 9 and carries a pin 28.

The knob 6 comprises an about truncated-cone-shaped shell, which is connected to the hub 6b by means of two spokes 6a. Two sleeves 29 and 30 are provided between the spokes 6a, which sleeves are mounted on the plate 9. A top plate 31 for the knob 6 is fixed with screws 32 and 33 on these sleeves. The top plate 31 has a radially disposed oblong slot 34, in which the pin 28 moves. The knob 7 which has on the surface facing the top plate 31 a spiral slot 36 (see FIG. 3), in which the pin 28 slides and by which it is controlled, is mounted by means of a screw 35 on the top plate 31. An index mark 37 interacting with the corresponding scales on the knobs 6 and 7 is attached to the top plate 31.

The illustrated arrangement has the following mode of operation: When the knob 6 is e.g. rotated clockwise, while the knob 7 stays still, the crank 12 moves the objective member 2b to the left. At the same time also the cam disc 11 is rotated, whereby the roller 21 is shifted to the right. Since the knob 7 is not moved, the lever 20 turns about the point 38 as a fixed point, thus effecting that the front member 2a of the objective is moved to the right.

But if, on the other hand, the knob 7 is rotated, while the knob 6 is left unchanged, the pin 28 is moved by the spiral slot 36 in the knob 7 in radial direction. By the connection rod 25 this movement is transferred to the lever 20, which is turning about the pivot pin 23 and giving the appropriate adjusting movement to the objective member 2a.

When both knobs 6 and 7 are rotated at the same time the above illustrated movements of the front member of the objective are superimposed. The adjusting means for the objective focal length and for focussing the objective is described in detail in my copending application Serial No. 856,501, filed December 1, 1959.

Figure 5:
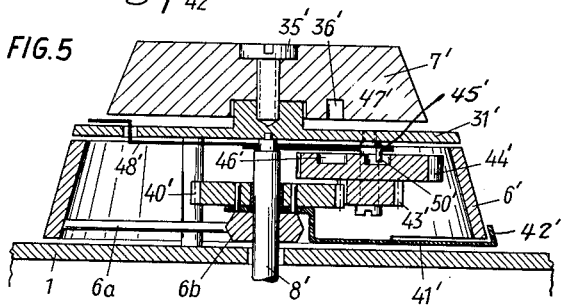

Referring now to FIG. 4, an embodiment of the present invention is shown, wherein parts of the structure have been removed in the interest of a clearer illustration. FIG. 5 is a section along the lines 5—5 of FIG. 4.

A gear wheel 40' is mounted rotatably with a relatively small fit on a shaft 8' of the focal length adjusting knob 6', so that a relative rotation is but possible, when using a special power, and incidental rotations are precluded. The gear wheel 40' is connected with a cranked lever 41' bearing an index mark 42' which is opposite a diaphragm scale attached to the periphery of the adjusting knob 6'.

The gear wheel 40' meshes with a gear wheel 43', which is rotatably mounted on the fixed top plate 31' and connected with a disc 44'. This disc 44' carries two spiral slots 45' and 46' on its surface which faces the top plate 31'. Further, two pointers 47' and 48' are mounted on the shaft 8' interacting with the distance scale on the knob 7' and controlled by pins 49' and 50' which glide in the spiral slots 45' and 46' respectively.

In this arrangement a coupling with the diaphragm adjusting device of the lens diaphragm is not provided for, so that the diaphragm values have to be transferred. However, it is within the scope of the present invention to provide a forced connection between the diaphragm adjusting means and depth of field indicator.

With the above described arrangement, the angle of rotation of the knob 6' equals the logarithm of the focal length, while the angle of rotation of the index mark 42' relative to the diaphragm scale equals the logarithm of the square of the diaphragm figures.

In order to meet these demands, it is advisable to control both movable optical members 2a and 2b of the objective by cam discs, so that the logarithmical scale trend may be kept exactly. In a small range, however, the logarithmical trend can also be approached by another function e.g. by a cosine function.

The mode of operation of the arrangement as described in FIGS. 4 and 5 is as follows:

When, starting from the illustrated adjustment, the index mark 42' is adjusted to the value $k=2.8$, the cam disc 44' is rotating clockwise, whereby the pins 49' and 50' are approached relative to each other by the spiral slots 45' and 46'. This entails, that the depth of the field range, as shown on the distance scale by the pointers 47' and 48' is decreased. Likewise a rotation of the adjusting knob 6' results in a change of the depth of the field range. By the above stated laws of motion of the adjusting device for focal length and diaphragm it is achieved that the depth of field range is shown as a function of $$\frac{\text{diaphragm figure}^2}{(\text{focal length})}$$

Figure 6:
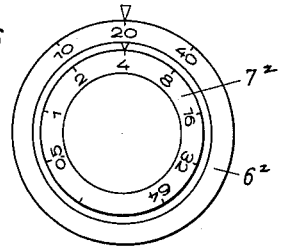
FIG. 6 is a plan view of a detail of still a further embodiment of the present invention.

In FIG. 6 a further embodiment is shown in a plan view, with which both the focal length scale and the distance scale are in logarithmical order. The control of the focal length is exercised according to the above statements. The adaptation of the focussing adjustment is effected by the appropriate formation of the spiral slot 36' in the knob 7'. This arrangement is of the advantage, that when the knobs $6^2$ and $7^2$ are jointly rotated, an object moving relatively towards the camera is always sharply imaged at the same size, which is a special advantage for sport photography. In two scales the logarithmical trend can also be approached by other functions, but care has to be taken that even under a most unfavorable condition when commonly rotating the two knobs for turning on a steady image size, the object has to stay within the depth of field range.

As the above mentioned embodiments can be varied without departing from the concept and scope of the present invention, it is to be understood that everything that has been shown in the accompanying drawings and that has been described above is to be understood as an example only and not as a limitation of the present invention, the scope of the latter being determined by the objects and the claims.

I claim:
1. A camera comprising
  a camera casing,
  a varifocal objective including a plurality of objective members defining an optical axis,
  an objective tube enclosing said objective members and mounted at least partly immerged in said camera casing,
  means controlling the movement of at least two objective members in the direction of the optical axis according to different laws, in order to vary upon axial movement of said objective members the focal length of said objective,
  two knobs rotatably mounted on a wall of said camera casing disposed parallel to the optical axis,
  said two knobs being rotatable about the same axis at a right angle to the optical axis of said objective,
  a cam disc,
  a lever,
  said cam disc being coupled to one of said knobs controlling said lever,
  a first arm of said lever engaging one of said movable objective members,
  means coupled to said one of said knobs controlling another of said movable objective members,
  a cam coupled to another of said knobs,
  a second arm of said lever being controlled by said cam and causing an additional axial movement of said one of said objective members coupled to said lever upon rotating said another of said knobs, thus focussing said objective.
2. The camera, as set forth in claim 1, wherein
  a spiral slot provided in an end of said another of said knobs which faces said camera casing acting as said cam,
  a pin guided in said spiral slot and coupled to said second arm of said lever causing the latter to move upon rotating said knob.
3. A camera comprising
  a camera casing,
  a varifocal objective including a plurality of objective members defining an optical axis,
  an objective tube enclosing said objective members and mounted at least partly immerged in said camera casing,
  means controlling the movement of two objective members in the direction of the optical axis according to different laws, in order to vary upon axial movement of said objective members the focal length of said objective,
  two knobs rotatably mounted on a wall of said camera casing disposed parallel to the optical axis,
  said two knobs being rotatable about the same axis at a right angle to the optical axis of said objective,
  a cam disc,
  a lever,
  said cam disc being coupled to one of said knobs controlling said lever,
  a first arm of said lever engaging one of said movable objective members,
  a crank coupled to said one of said knobs and engaging another of said movable objective members,
  a cam coupled to another of said knobs,
  a second arm of said lever being controlled by said cam causing an additional movement of said one of said objective members upon rotating said another of said knob, thus focussing said objective.

4. A camera, comprising
a camera casing,
a varifocal objective including a plurality of objective members defining an optical axis,
an objective tube enclosing said objective members and mounted at least partly immerged in said camera casing,
means controlling the movement of at least two objective members in the direction of the optical axis according to different laws, in order to vary upon axial movement of said objective members the focal length of said objective,
two knobs rotatably mounted on a wall of said camera casing disposed parallel to the optical axis,
said two knobs being rotatable about the same axis at a right angle to the optical axis of said objective,
means operatively coupled to one of said knobs for displacement of one of said movable objective members along the optical axis,
means coupled to said one of said knobs controlling the other of said movable objective members, and
means operatively coupled to the other of said knobs causing an additional axial movement of said one of said objective members upon rotation of the other of said knobs, to focus said objective and at the same time maintain a constant image size.

5. The camera, as set forth in claim 4, wherein
at least two pointers are provided, which are controlled by said means arranged for adjusting the focal length of said objective,
a distance scale coacting with said one of said knobs serving for focussing said objective,
said pointers being arranged opposite said distance scale indicating on the latter the depth of field of the image at fixed diaphragm aperture values.

6. The camera, as set forth in claim 4, which includes
a scale of diaphragm aperture values,
a mark coacting with said scale,
a diaphragm secured in said camera casing,
means for adjusting the diaphragm aperture,
two pointers operatively connected with said diaphragm adjusting means and controlled in dependence upon the diaphragm aperture value adjusted on said scale, and further controlled by said means arranged for adjusting the focal length of said objective,
a distance scale coacting with said one of said knobs serving for focussing said objective,
said pointers being arranged opposite said distance scale indicating on the latter the depth of field of the image.

7. A camera comprising
a camera casing,
a varifocal objective including a plurality of lenses defining an optical axis,
an objective tube enclosing said lenses and mounted at least partly immerged in said camera casing,
means controlling the movement of at least two of said lenses in the direction of said optical axis in order to vary upon axial movement of said lenses the focal length of said objective,
a first knob rotatably mounted on a wall of said camera casing disposed parallel to said optical axis,
said first knob being coupled to said means controlling the movement of said lenses,
at least one of said lenses being arranged for axial movement within said objective tube for focussing said objective,
a second knob rotatably mounted on the wall of said camera casing carrying said knob for adjusting the focal length and coupled to said means controlling the movement of said one of said lenses for focussing said objective,
said two knobs being rotatable about the same axis, the latter being disposed at a right angle to the optical axis of said objective,
a diaphragm secured in said camera casing,
means for adjusting the diaphragm aperture,
a scale of diaphragm values provided on said first knob arranged for adjusting the focal length of said objective,
a pointer coaxially mounted on said knob opposite said diaphragm scale and operatively connected with said diaphragm adjusting means,
a slipper clutch,
said pointer being coupled over said slipper clutch with said first knob,
a cam,
a bearing fixed relative to said camera casing,
a cam disc rotatably mounted in said bearing and driven by said diaphragm value adjusting pointer,
two additional pointers coaxially mounted relative to said first knob and controlled by said cam,
a distance scale arranged on said second knob and coacting with a fixed mark,
said two additional pointers being arranged opposite said distance scale indicating thereon the depth of field of the image in dependence upon the adjusted focal length and the diaphragm aperture.

8. The camera, as set forth in claim 7, wherein
said means for adjusting the focal length are arranged in a manner that the angle of rotation of said first knob is equal to the logarithm of the focal length adjustment,
the angle of rotation of said pointer of said diaphragm scale being equal to the logarithm of the square of the diaphragm figures ($k$), so that upon rotating said first knob, said cam is rotated according to the value $$\frac{k}{f^2}$$

9. A camera comprising
a camera casing,
a varifocal objective including a plurality of lenses defining an optical axis,
an objective tube enclosing said lenses and mounted at least partly immerged in said camera casing,
means controlling the movement of at least two lenses in the direction of the optical axis in order to vary upon axial movement of said lenses the focal length of said objective,
means controlling the movement of said lenses,
a first knob rotatably mounted on a wall of said camera casing disposed parallel to said optical axis,
said knob being coupled to said means controlling the movement of said lenses,
at least one of said lenses being arranged for axial movement within said objective tube for focussing said objective,
a second knob rotatably mounted on a wall of said camera casing carrying said first knob for adjusting the focal length and coupled to said means controlling the movement of said lens for focussing said objective,
said first and second knobs being rotatable about the same axis, the latter being disposed at a right angle to the optical axis of said objective,
said means for controlling the movement of said lenses for adjusting the focal length being arranged in a manner that the angle of rotation of said second knob is substantially equal to the logarithm of the focal length adjustment,
said means controlling the movement of said one of said lenses for focussing said objective being arranged in a manner that the angle of rotation of said first knob is substantially equal to the logarithm of the adjustment of the object distance, and
that upon adjusting said first and second knobs in the same direction the values of the focal length and object distance are increased and decreased, respectively.

References Cited by the Examiner
UNITED STATES PATENTS

| | | | |
|---|---|---|---|
| 2,165,341 | 7/39 | Capstaff | 95—45 |
| 2,924,146 | 2/60 | Back | 95—45 X |
| 2,983,209 | 5/61 | Werner | 95—45 |

FOREIGN PATENTS

| | | |
|---|---|---|
| 1,208,601 | 9/59 | France. |
| 1,240,209 | 7/60 | France. |

NORTON ANSHER, *Primary Examiner.*

JOHN M. HORAN, *Examiner.*